United States Patent [19]
Deller et al.

[11] Patent Number: 5,717,331
[45] Date of Patent: Feb. 10, 1998

[54] DEMODULATOR CIRCUIT FOR USE WITH A DISPLACEMENT SENSOR TO PROVIDE POSITION INFORMATION

[75] Inventors: Robert W. Deller, Saugus; Robert Heagey, Santa Clarita, both of Calif.

[73] Assignee: H.R. Textron, Inc., Valencia, Calif.

[21] Appl. No.: 533,482

[22] Filed: Sep. 22, 1995

[51] Int. Cl.$^6$ .............................. G01B 7/14; H01F 21/06
[52] U.S. Cl. .................. 324/207.18; 324/207.12; 340/870.36; 327/72
[58] Field of Search ................ 324/233, 207.12, 324/207.18, 207.17, 207.24, 207.25, 227, 236, 207.15, 207.16; 340/870.31, 870.32, 870.35, 870.36; 318/656–661; 327/72

[56] References Cited

U.S. PATENT DOCUMENTS

| | | | |
|---|---|---|---|
| 3,491,289 | 1/1970 | Petrini | 324/207.18 |
| 3,631,355 | 12/1971 | Vail | 327/11 |
| 3,710,267 | 1/1973 | Fawcett | 329/363 |
| 3,714,593 | 1/1973 | Kime et al. | 324/615 |
| 4,047,086 | 9/1977 | Cocksedge | 318/608 |
| 4,100,480 | 7/1978 | Lytle et al. | 340/870.35 |
| 4,134,065 | 1/1979 | Bauer et al. | 324/207.18 |
| 4,565,970 | 1/1986 | Rider | 329/348 |
| 4,599,560 | 7/1986 | Sanford et al. | 324/207 |
| 4,628,270 | 12/1986 | Roberts | 329/360 |
| 4,755,751 | 7/1988 | Ray | 324/207.18 |
| 4,847,556 | 7/1989 | Langley | 324/207.18 |
| 4,857,919 | 8/1989 | Braswell | 324/207.17 |
| 4,875,007 | 10/1989 | Ginns | 324/207.12 |
| 4,904,921 | 2/1990 | DeVito et al. | 323/264 |
| 4,906,924 | 3/1990 | Zannis | 324/207.18 |
| 4,916,391 | 4/1990 | Doerman et al. | 324/207.18 |
| 4,972,163 | 11/1990 | Van Der Plas | 331/14 |
| 4,982,156 | 1/1991 | Lewis et al. | 324/207.18 |
| 4,989,219 | 1/1991 | Gerdes et al. | 375/377 |
| 5,061,896 | 10/1991 | Schmidt | 324/207.18 |
| 5,087,894 | 2/1992 | DeVito et al. | 331/66 |
| 5,327,030 | 7/1994 | DeVito et al. | 324/207.18 |

FOREIGN PATENT DOCUMENTS

| | | | |
|---|---|---|---|
| 53-119653 | 10/1978 | Japan | |
| 62-215802 | 9/1987 | Japan | |
| 697800 | 11/1979 | U.S.S.R. | |
| 1026262 | 6/1983 | U.S.S.R. | 324/207.18 |

Primary Examiner—Sandra L. O'Shea
Assistant Examiner—Jay M. Patidar
Attorney, Agent, or Firm—Robbins, Berliner & Carson, LLP

[57] ABSTRACT

To allow a displacement sensor to operate independently of changes in the excitation signal to the transducer, a demodulating circuit utilizing a single integrator is provided wherein comparison is made between the excitation signal and a reference signal, the comparison is used to adjust an output generating circuit which generates the output from the transducer. Advantageously, the output generating circuit can provide movement information from output of the transducer which include position, velocity and acceleration.

12 Claims, 10 Drawing Sheets

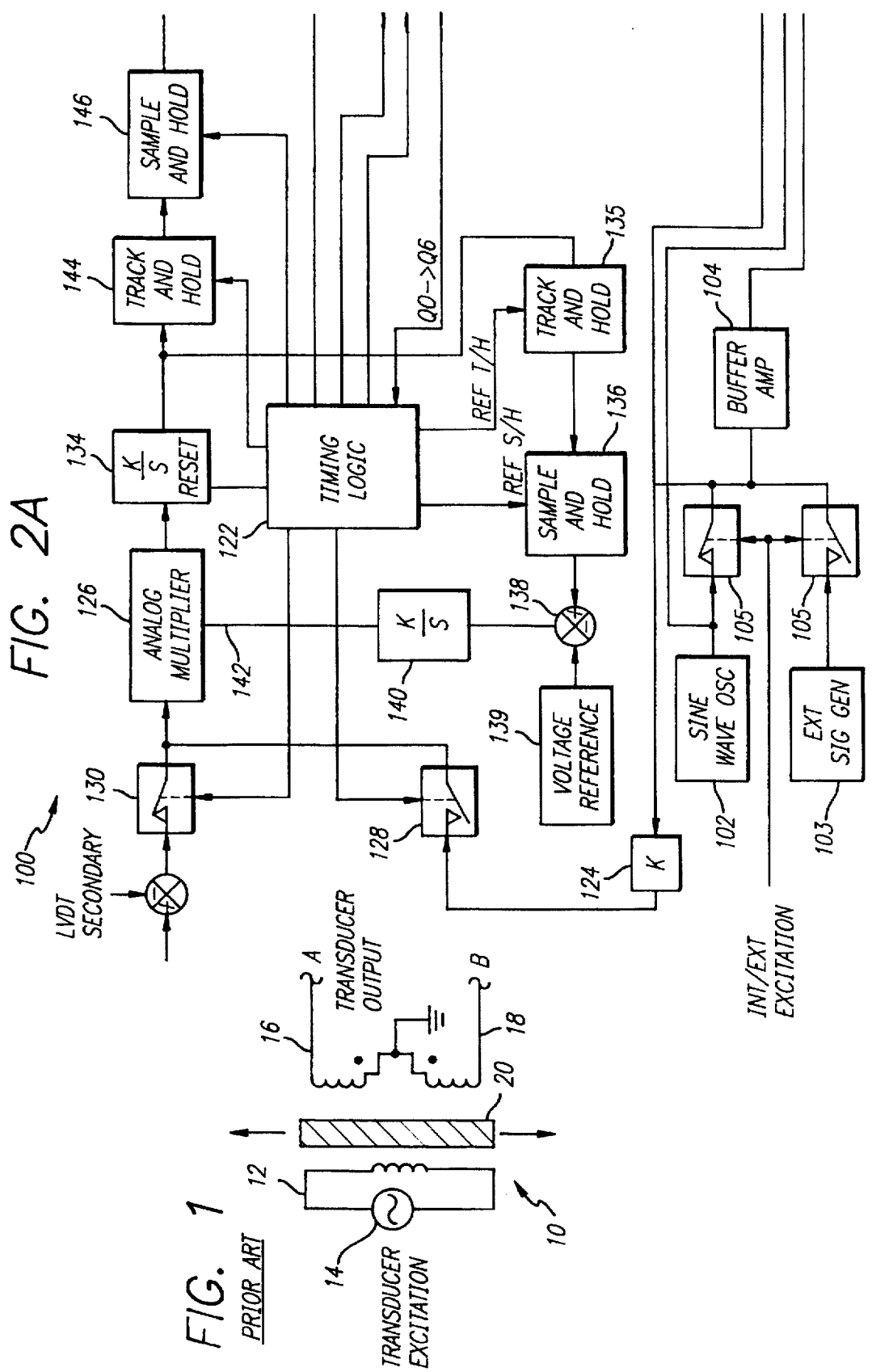

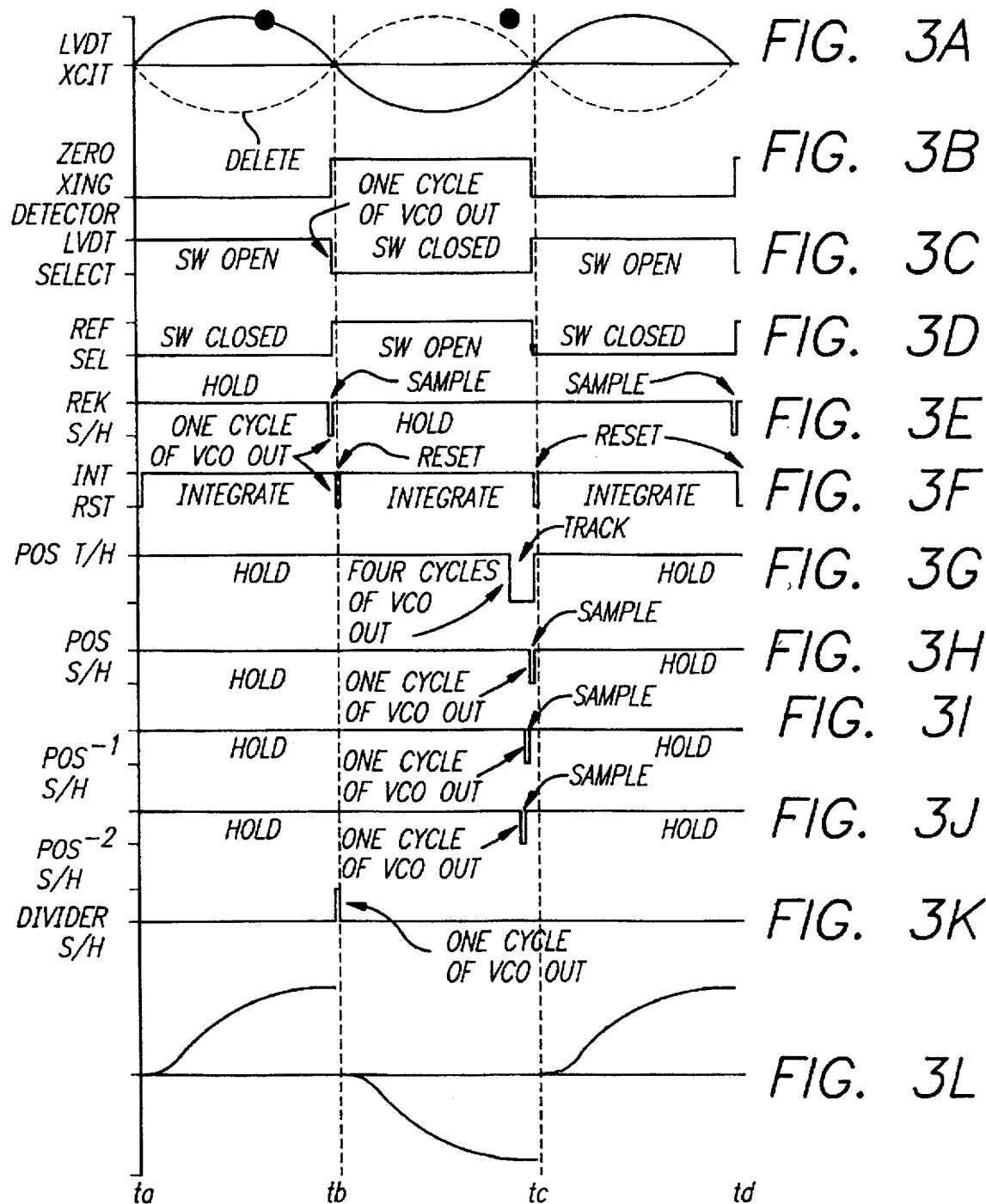

DEMODULATOR CIRCUIT FOR USE WITH A DISPLACEMENT SENSOR TO PROVIDE POSITION INFORMATION

TECHNICAL FIELD OF THE INVENTION

The present invention is related in general to displacement sensors such as linear variable differential transformers (LVDTs) and rotary variable differential transformers (RVDTs), and in particular to a circuit for demodulating the output of a displacement sensor. More particularly, the present invention is related to a demodulator circuit capable of decoding the output of a displacement sensor to provide displacement, velocity and acceleration information independent of changes in the amplitude and/or frequency of the excitation signal operating the sensor.

BACKGROUND OF THE INVENTION

Displacement sensors such as LVDTs and RVDTs are commonly used in various applications, such a actuators connected to aero-space vehicle control surfaces, machine tools and the like, for movement detection. A displacement sensor generally has a primary coil and two secondary coils. The coils are wound on a bobbin wherein a movable slug is enclosed. The primary coil receives an excitation signal which induces mutually opposite currents in the two secondary coils. Because the position of the slug affects the inductance between the primary coil and each of the secondary coils, the currents induced in the secondary coils by the excitation signal can thus be used to detect position of the slug.

Unfortunately, the currents induced in the secondary coils are also dependent upon the frequency and amplitude of the excitation signal. If either the amplitude or the frequency of the excitation signal changes, the output of the sensors would change even when the slug remains stationary. Therefore, to operate properly, conventional displacement sensors generally require an excitation signal with stable amplitude and frequency.

Operability and cost of sensors would greatly improve if a stable excitation signal is not required. For example, if there is no requirement of a stable excitation signal, the sensor can then be operated with any desired excitation signal in which case the same excitation signal which is used to drive for example, the LVDT of an actuator can also be used to drive a hydraulic valve's LVDT, thus eliminating the possibility of "beat" frequencies when two different excitation signals are used.

Therefore, what is needed is a displacement sensor which can provide accurate displacement information without requiring a stable excitation signal.

Moreover, in applications such as a high performance control loop, information on velocity and acceleration of the slug, in addition to its displacement, is sometimes required for stabilization purposes. Unfortunately, to provide velocity and acceleration information, conventional displacement sensors either require additional transducers, or a slug that has both high permeability and magnetic retentability.

Therefore, what is also needed is a displacement sensor which can provide velocity and/or acceleration information without the need of additional transducers and without the need of a special slug.

SUMMARY OF THE INVENTION

The present invention is related to a circuit for use with a displacement sensor which produces an output signal in response to an excitation signal. The circuit according to the present invention is capable of demodulating the output signal of the displacement sensor to provide displacement information independent of changes in the excitation signal. It comprises a circuit for generating the displacement information from the output signal, and an adjustment circuit for monitoring a reference signal generated based upon the excitation signal and adjusting operation of the generating circuit based upon changes in the frequency and/or amplitude of the reference signal over a time period and includes a timing circuit for generating a timing signal and a plurality of control signals based upon the frequency of the reference signal and timing logic responsive to the timing signal.

BRIEF DESCRIPTION OF THE DRAWINGS

FIG. 1 is a schematic diagram depicting a conventional displacement sensor.

FIG. 3 shows the timing of the outputs at various parts of the demodulator of FIG. 2.

DESCRIPTION OF THE PREFERRED EMBODIMENTS

Figure 2B:
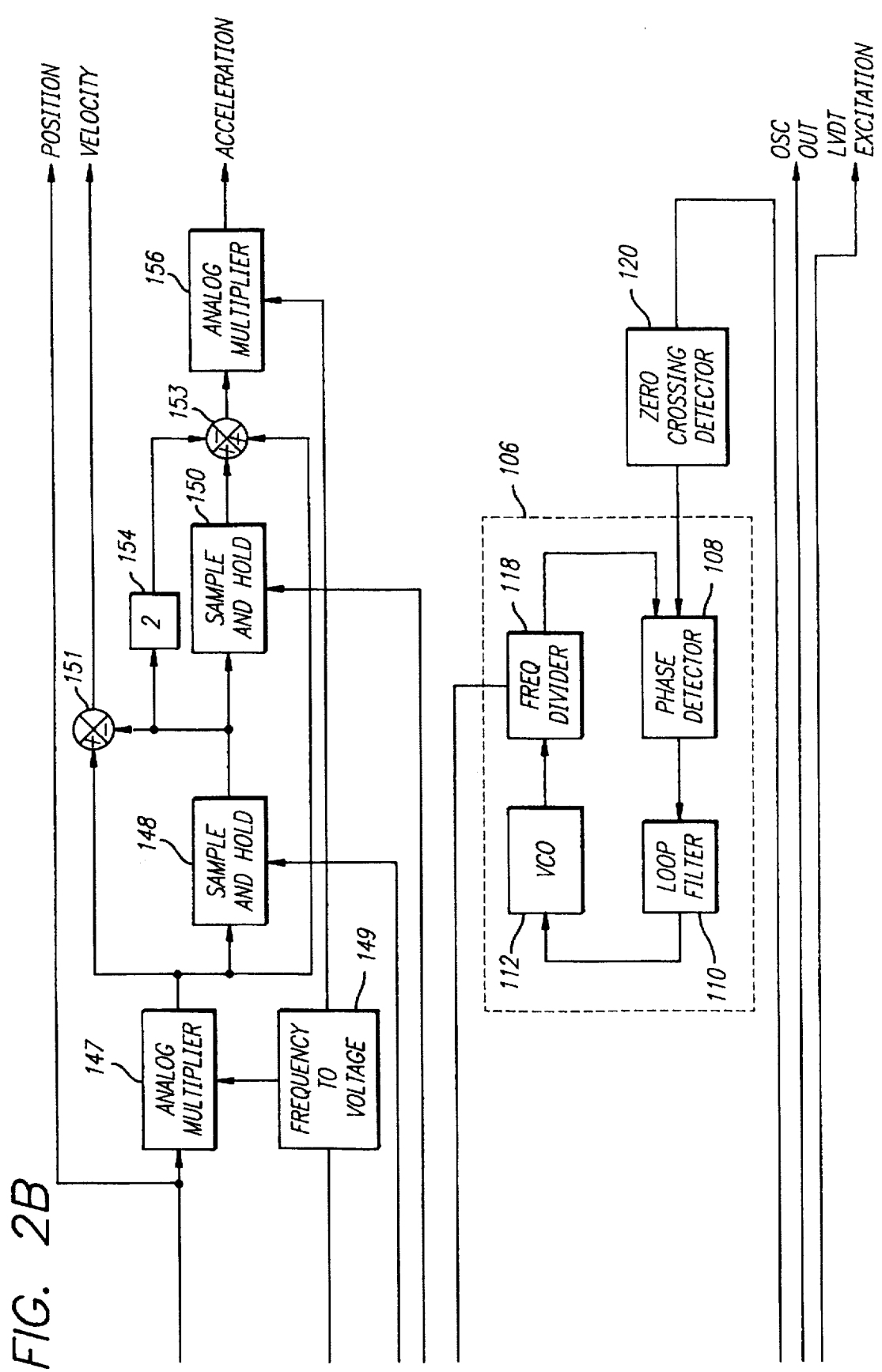
FIG. 2 is a block diagram of a demodulator using a phase lock loop which embodies the present invention.
Figure 4A:
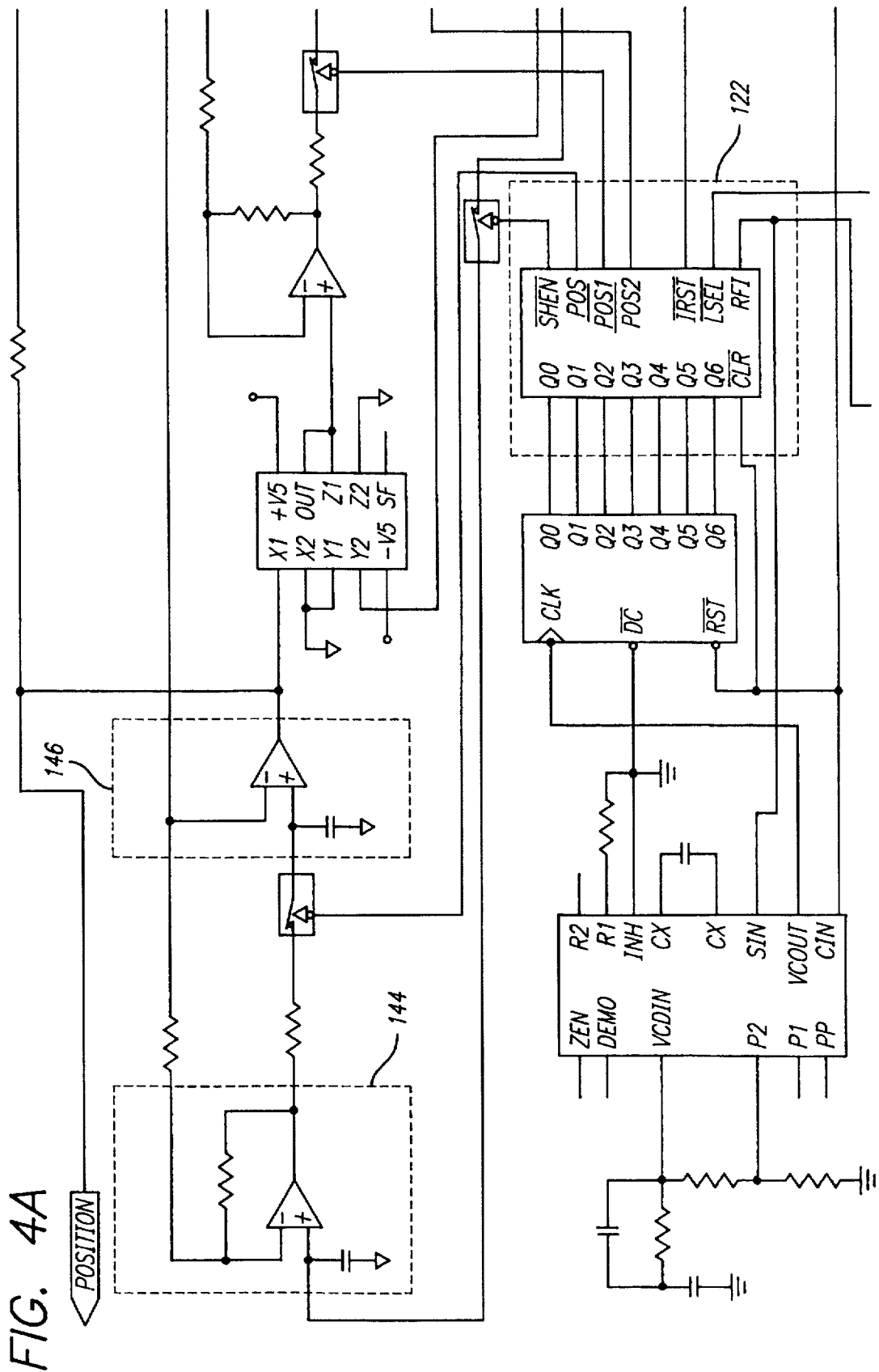
FIG. 4 is a schematic circuit diagram of an implementation of the demodulator shown in FIG. 2.
Figure 4B:
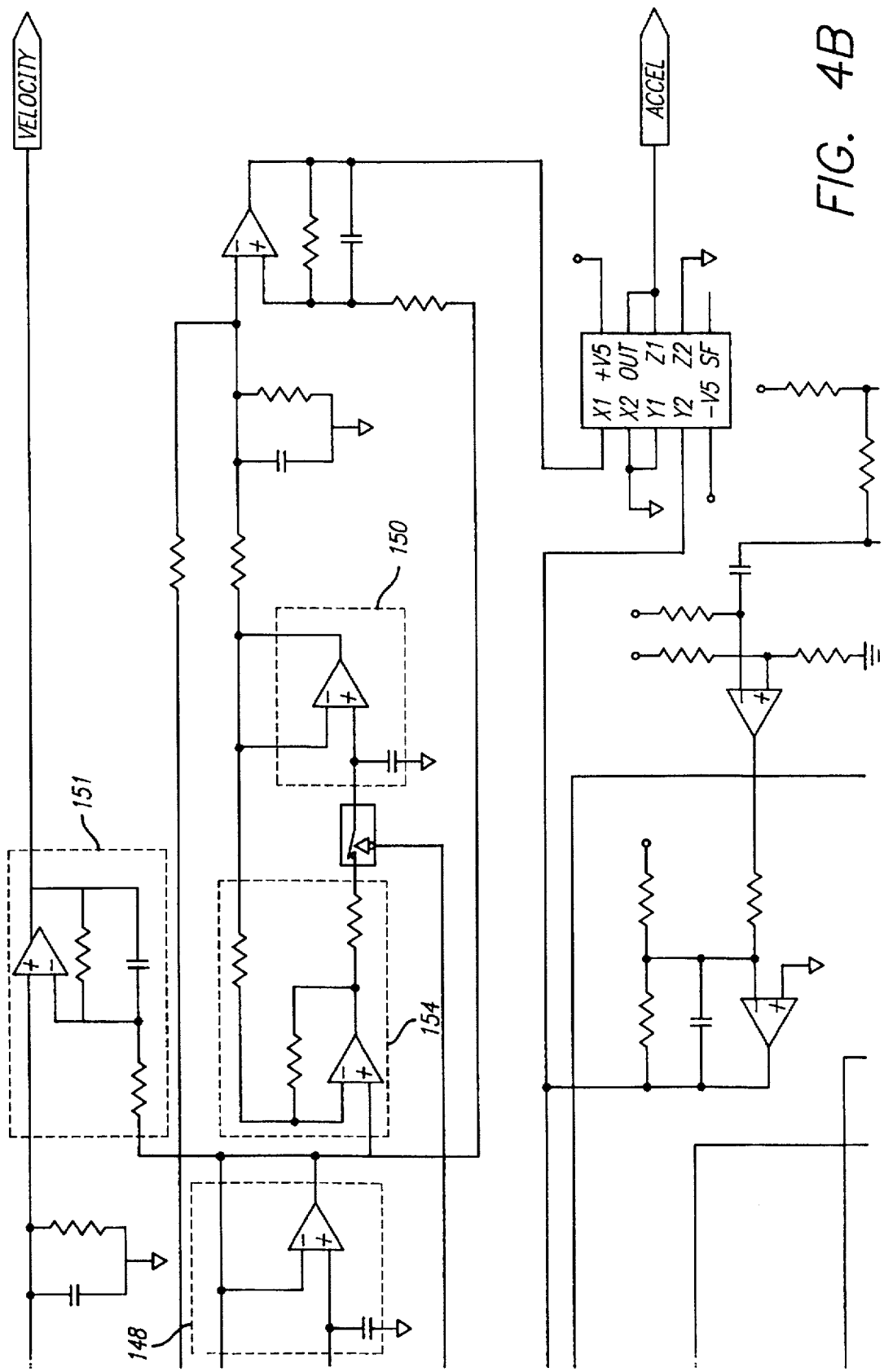
Figure 4C:
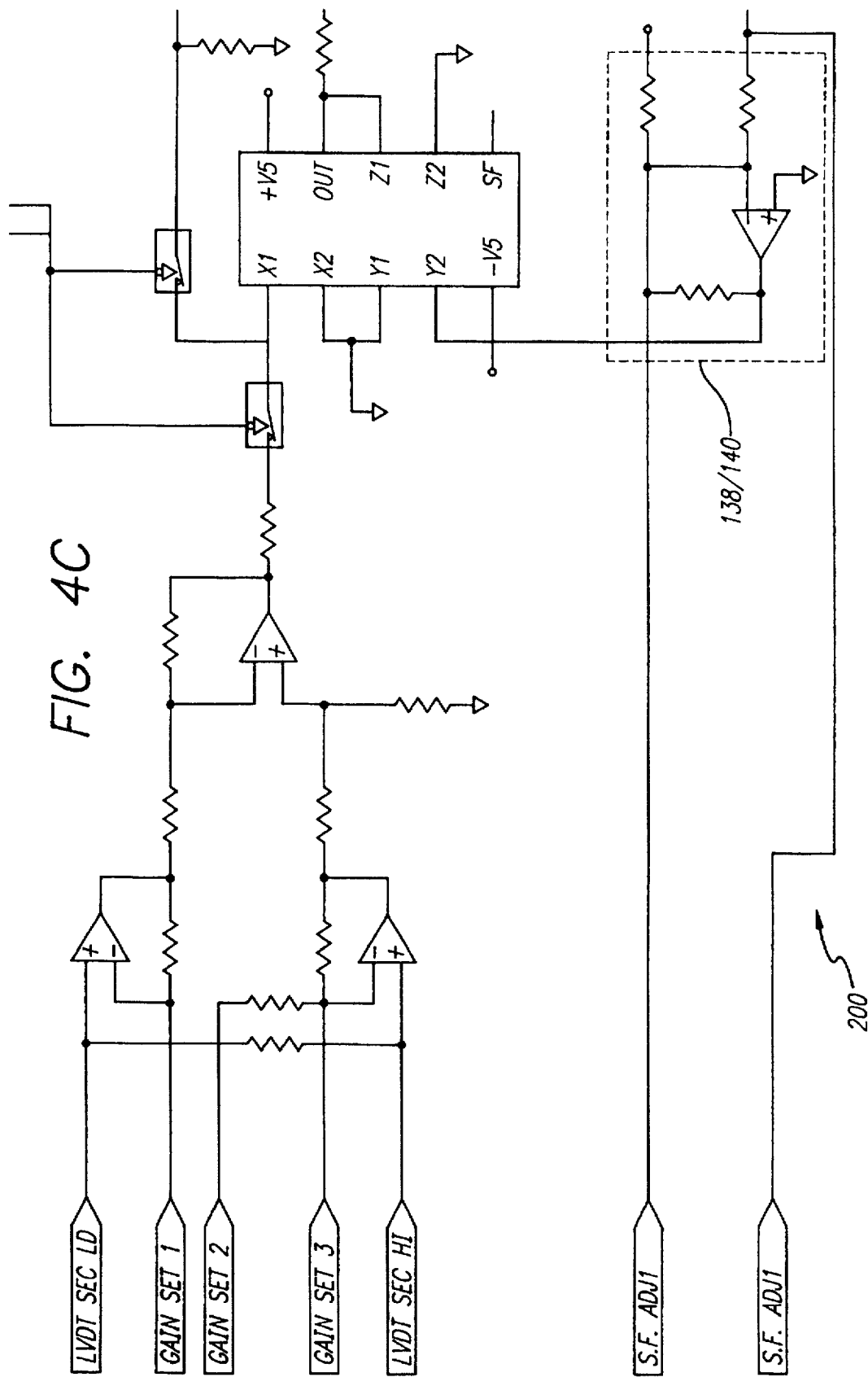
Figure 4D:
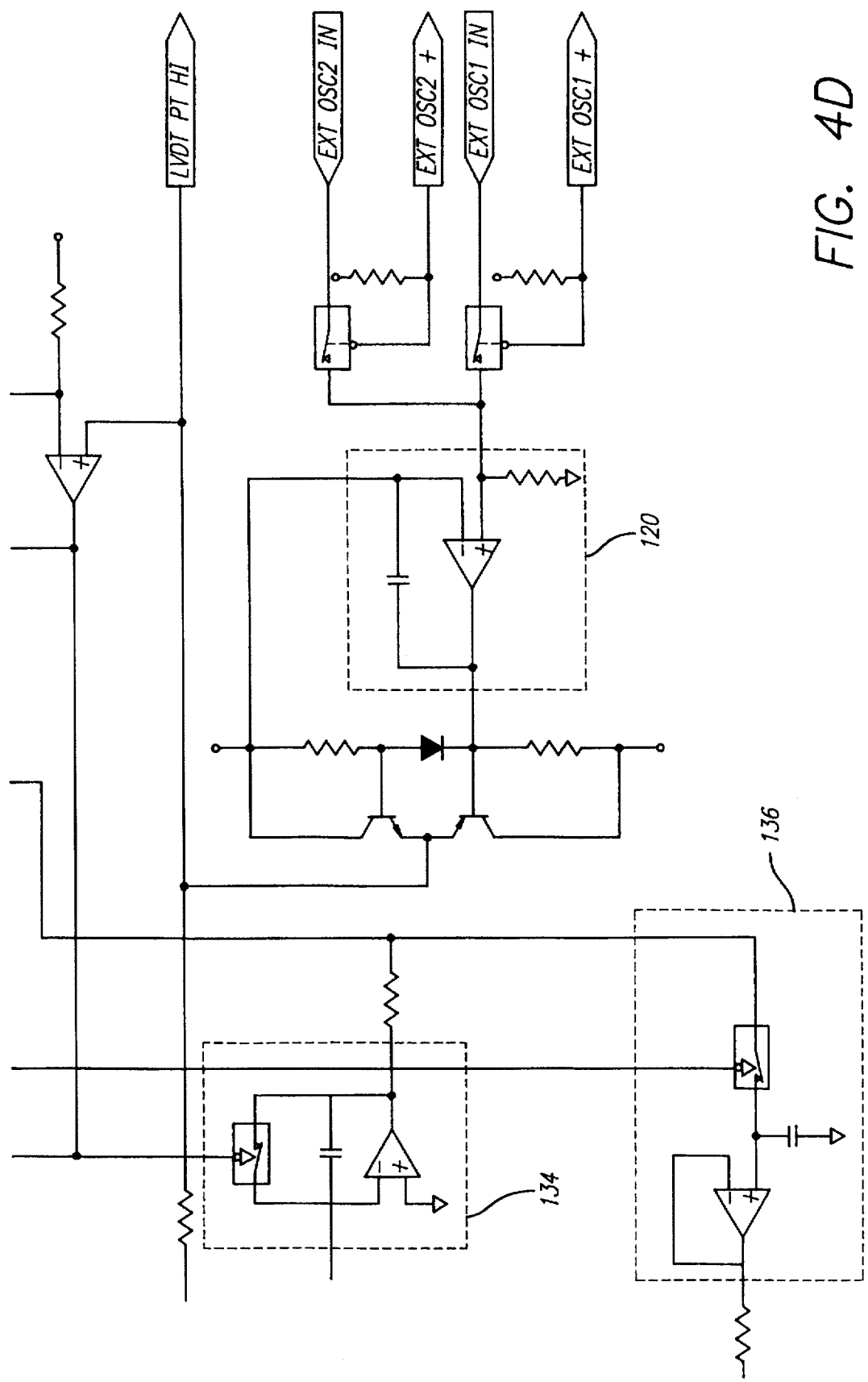

FIG. 1 is a schematic diagram of a conventional LVDT 10 having a primary coil 12 which receives an excitation signal from a source 14 to induce an output A in a first secondary coil 16 and an output B in a second secondary coil 18. The source 14 can be a signal generator producing either a sine wave, square wave, triangular wave or other type of signal. The outputs A and B are generated in response to the excitation signal and are dependent upon the position of a slug 20 relative to the primary coil 12 and the two secondary coils 16, 18. The secondary coils 16, 18 are connected in such a way that outputs A and B are mutually opposite.

FIG. 2 is the block diagram of a circuit 100 for demodulating an output signal from a LVDT (the "LVDT output signal") to provide position, velocity and acceleration information. The demodulator 100 has an internal signal generator in the form of a sine wave oscillator 102 for generating the excitation signal.

Alternatively, the excitation signal can be generated by an external source 103. Selection between the external and internal sources is made by a signal which controls the switch 105.

A buffer 104 with low output impedance is provided in the demodulator 100 for applying the excitation signal to the LVDT 10. The excitation signal from the buffer 104 is first converted into a square wave signal by a zero crossing detector 120. After the conversion, the excitation signal is sent to a phase lock loop (PLL) 106 formed by components, such as a phase detector 108, a loop filter 110, a voltage controlled oscillator (VCO) 112 and a frequency divider 118 that are commonly found in conventional phase lock loops. The PLL 106 locks onto the excitation signal and generates a plurality of signals, $Q_0$–$Q_6$. The signals $Q_0$–$Q_6$ can be generated using a programmable array logic (PAL) such as PAL16R, based upon the following logic equation:

$$D_n = (-Q_{n-1} * -Q_n) + (Q_{n-1} * Q_n)$$

The signals $Q_0$–$Q_6$ are applied to a timing decoder 122, which operates in response to the clock signals $Q_0$–$Q_6$ to generate a plurality of control signals, LVDT_SEL, REF_SEL, REF_S/H, INT_RST, S/H_EN, POS_S/H, POS-1S/H and POS-2S/H. These signals are respectively shown in lines 3C, 3D, 3E, 3F, 3G, 3H, 3I and 3J of FIG. 3. The logic equations for generating these signals are:

$$POS\text{-}2S/H = \{\text{-}Q_6 \cdot Q_5 \cdot Q_4 \cdot Q_3 \cdot Q_2 \cdot Q_1 \cdot Q_0\}$$

$$POS\text{-}1S/H = \{\text{-}Q_6 \cdot Q_5 \cdot Q_4 \cdot Q_3 \cdot Q_2 \cdot Q_1 \cdot \text{-}Q_0\}$$

$$POS\_S/H = \{\text{-}Q_6 \cdot Q_5 \cdot Q_4 \cdot Q_3 \cdot Q_2 \cdot \text{-}Q_1 \cdot Q_0\}$$

$$INST\_RST = \{\text{-}Q_5 \cdot \text{-}Q_4 \cdot \text{-}Q_3 \cdot \text{-}Q_2 \cdot \text{-}Q_1\}$$

$$REF\_S/H = \{Q_6 \cdot Q_5 \cdot Q_4 \cdot Q_3 \cdot Q_2 \cdot Q_1 \cdot Q_0\}$$

$$S/H\_EN = \{\text{-}Q_6 \cdot Q_5 \cdot Q_4 \cdot Q_3 \cdot Q_2\}$$

$$LVDT\_SEL = \{\text{-}Q_6 \cdot Q_5 \cdot Q_4 \cdot Q_3 \cdot Q_2\}$$

$$REF\_SEL = \text{-}LVDT\_SEL$$

The excitation signal is also applied to a gain block 124. The output of gain block 124 is applied to an input of the multiplier 126 via a switch 128. The same input of the multiplier 126 also receives the output signal from the LVDT via a second switch 130.

Switches 128 and 130 are controlled by the control signals REF_SEL and LVDT_SEL respectively. As shown in lines 3C and 3D of FIG. 3, these two control signals are complementary so that only one of the above identified two inputs is connected to the multiplier 126 at any time.

Referring to the timing diagram of FIG. 3, between ta–tb, the control signals REF_SEL and LVDT_SEL disconnect the LVDT output signal from the multiplier 126 and connect the excitation signal thereto. The output of the multiplier 126 is integrated by an integrator 134 to produce a signal with a waveform shown in portion ta–tb of line 3L of FIG. 3.

At tb, in response to the signals REF_T/H and REF_S/H (see line 3E), the width of which is equal to one cycle of the output from VCO 112, the output from integrator 134 is serially applied to the track and hold 15 circuit 135 and is sampled by a sample-and-hold circuit 136. After its output is sampled, integrator 134 is reset to zero by the signal INT_RST (see line 3F).

The output of the sample-and-hold circuit 136 is applied to one input of the adder 138. The other input of adder 138 receives a reference voltage 139 which is set based upon parameters of the LVDT, such as its full scale deflection, maximum position and stroke. The adder 138 compares the output from sample-and-hold circuit 136 and the reference voltage 139. The output of adder 138 is applied to an integrator 140, the output of which is connected to the second input of multiplier 126. In effect, the loop formed by multiplier 126, integrator 134, sample-and-hold circuit 136, adder 138 and integrator 140 operates as an automatic gain control to adjust the amplitude of the signal 142 (i.e., the signal from the integrator 140 to the multiplier 126) so that the output from the sample-and-hold circuit 136 is equal to the reference voltage.

Between tb–tc, control signals REF_SEL and LVDT_SEL reverse, thereby disconnecting the excitation signal from the multiplier 126 and connecting the LVDT output signal thereto. The multiplier 126 multiples the LVDT output signal by the signal 142. As a result, the LVDT output signal is adjusted in response to changes in the amplitude of the excitation signal. In other words, if the amplitude of the excitation signal decreases, the LVDT output signal is decreased proportionally even though the LVDT may not have detected a change in position, and vice versa.

The adjusted LVDT output signal is integrated by integrator 134 to produce an output shown in portion tb–tc of line 3L in FIG. 3. The output of the integrator 134 is applied to a track-and-hold circuit 144. In response to the control signal POS_T/H, the track-and-hold circuit 144 gates the output of the integrator 134 to the sample-and-hold circuit 146. The function of the track-and-hold circuit 144 is to provide noise buffering by limiting the window for passing the output of integrator 134 to the sample-and-hold circuit 146. The sample and hold circuit 146 samples the signal from the track and hold circuit in response to the control signal POS_S/H. The output signal from the sample and hold circuit 146 gives the position $S(t_0)$ of the slug 20 at time $t_0$.

The output of the sample and hold circuit 146 is applied as an input signal to the analog multiplier 147. The analog multiplier 147 is gated on responsive to a signal generated by the frequency to voltage converter 149 which in turn is activated by the zero crossing detector through the timing logic 122. The output of the analog multiplier is applied as an input signal to the serially connected sample and hold circuits 148 and 150.

The two sample-and-hold circuits 150 and 148 sample the output from the analog multiplier circuit 147 in response to control signals, POS-2S/H, POS-1S/H, respectively. Referring to lines 3I and 3J of FIG. 3, the timing of these signals is such that POS-2S/H is one VCO cycle before POS-1S/M, which in turn is one VCO cycle before POS_S/H. As a result, the content of sample-and-hold circuit 148 is the content of sample-and-hold circuit 146 one excitation cycle before tc, and the content of sample-and-hold circuit 150 is the content of sample-and-hold circuit 146 two excitation cycles before tc. In effect, the output of sample-and-hold circuit 146 gives the position $S(t_0)$ of the slug 20 at time $t_0$, the output of sample-and-hold circuit 148 gives the position $S(t_{-1})$ of the slug 20 at $t_{-1}$, one excitation cycle before $t_0$, and the output of sample-and-hold circuit 150 gives a position $S(t_{-2})$ of the slug 20 at time $t_{-2}$, two excitation cycles before time $t_0$.

Between time $t_{-1}$ and $t_0$, displacement of the slug is $S(t_{-1})$–$S(t_0)$. The velocity of the slug 20 is $S(t_{-1})$–$S(t_0)$ and is represented by the output of the adder 151. The acceleration of the slug 20, is the rate of change of the velocity and can be calculated by finding the difference between velocity $[S(t_{-1})$–$S(t_0)]$ of the slug 20 from $t_{-1}$ to $t_0$, and the velocity $[S(t_{-2})$–$S(t_{-1})]$ of the slug 20 from $t_{-2}$ to $t_{-1}$. Thus, acceleration of the movement is a function of:

$$[S(t_{-2})\text{-}S(t_{-1})]\text{-}[S(t_{-1})\text{-}S(t_0)],$$

or $$[S(t_0)\text{-}S(t_{-2})\text{-}2*S(t_{-1})]$$

and is represented by the signal output from the analog multiplier 156 which has as one input the output of the adder 153 and its other input is the output of the frequency to voltage converter 149. The adder 153 input signals are the position signal at $S(t_{-2})$, the position signal at $S(t_0)$ and two times the position signal at $S(t_{-1})$.

Referring again to FIG. 2, the output $S(t_0)$ of sample-and-hold circuit 146 is added to the output $S(t_{-1})$ of sample-and-hold circuit 148 at adder 151 to give the velocity of the displacement between time $t_0$ and $t_{-1}$. The output of the sample-and-hold circuit 148 is multiplied by an amplifier 154 with a gain of two (×2). The output of amplifier 154 is added to the output of sample-and-hold circuits 146 and 150 at adder 153 to give the acceleration of the displacement between $t_0$ and $t_{-2}$.

An exemplary implementation 200 of the demodulator 100 is shown in the schematic circuit diagram of FIG. 4. Parts in the two circuits 100, 200 which perform equivalent functions are given the same reference numerals to facilitate understanding thereof.

Figure 5A:
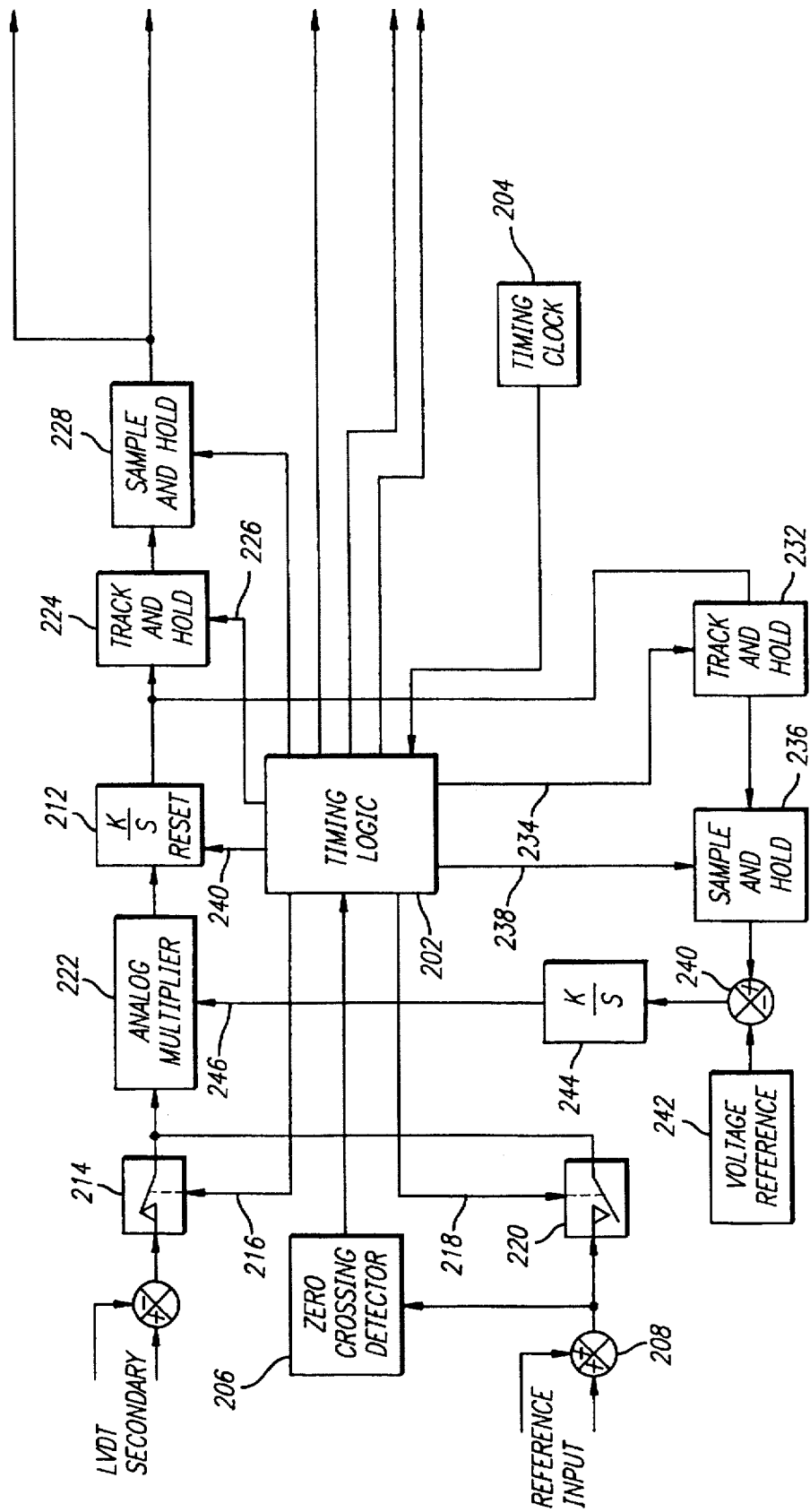
FIG. 5 is a block diagram of a preferred demodulator using timing logic which is another embodiment of the present invention.
Figure 5B:
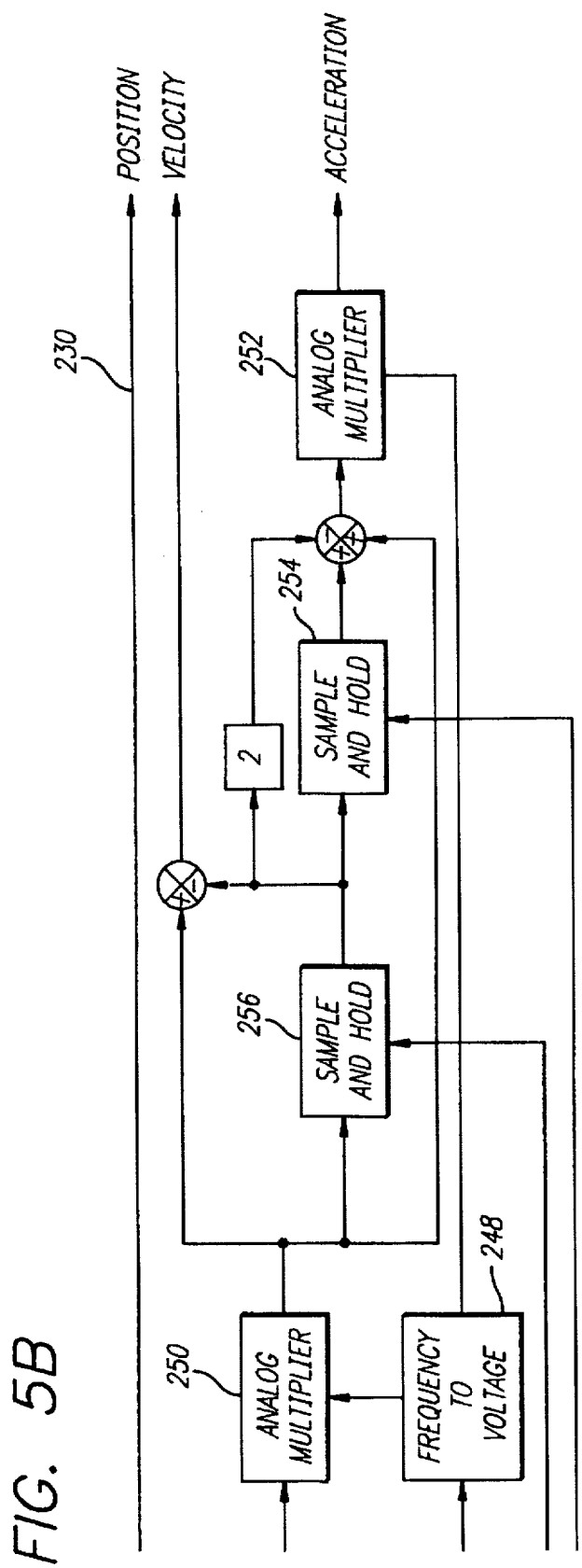
Figure 6:
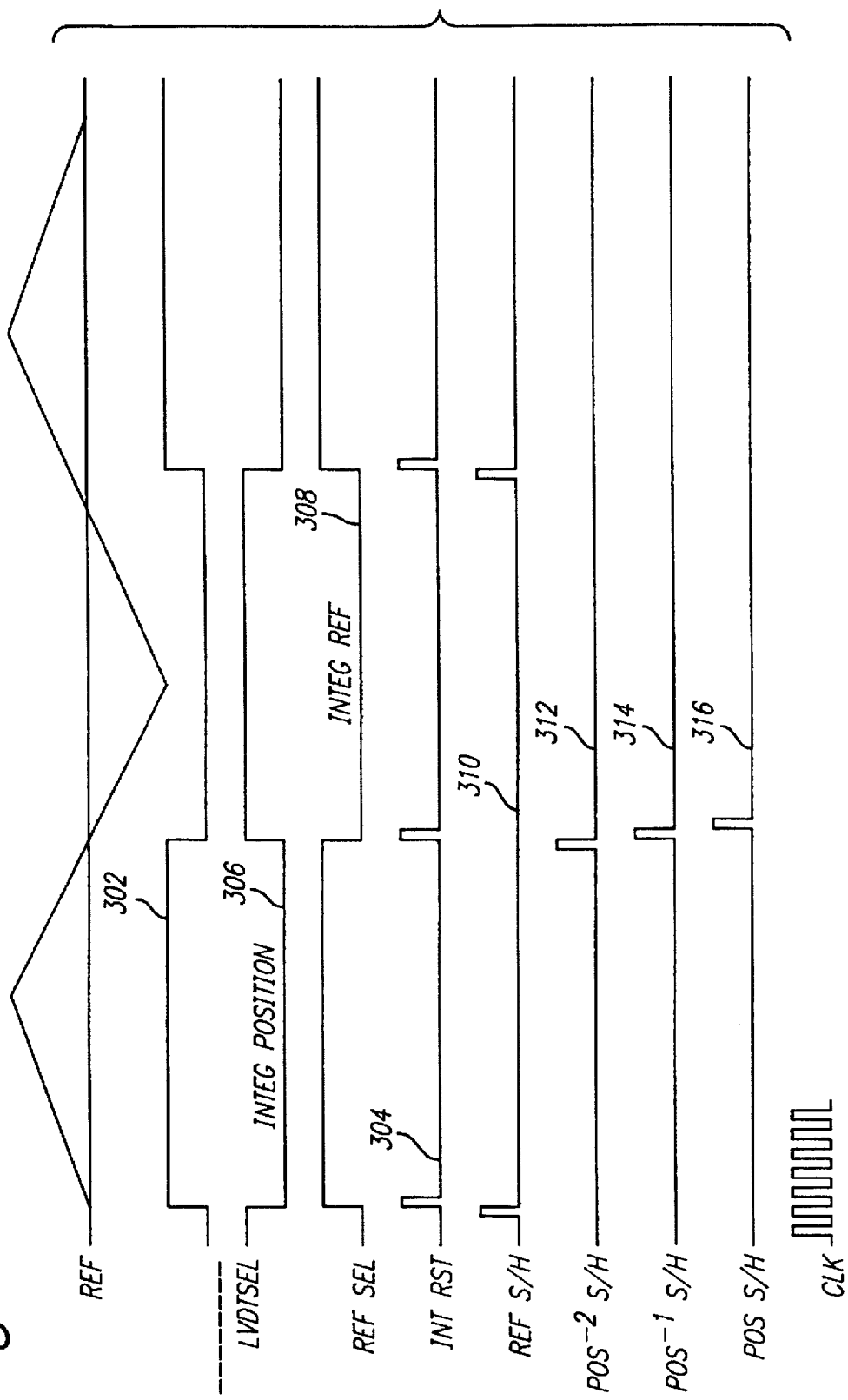
FIG. 6 shows the timing of the outputs at various parts of the demodulator of FIG. 5.

By reference now more particularly to FIGS. 5 and 6 there is illustrated a preferred and alternative embodiment of a demodulator circuit as above described along with the timing diagram which is applicable thereto. The embodiment as shown in FIG. 5. is much simpler in that the phase lock loop as illustrated and described above with respect to FIG. 2 has been eliminated and has been replaced by an erasable programmable logic device (EPLD) which has been programmed to provide the gating or command signals for operation of various portions of the circuit to obtain the desired output signals as above discussed. The preferred embodiment as shown in FIG. 5 like the embodiment shown in FIG. 2 provides the output position signal irrespective of changes in amplitude or frequency which may have occurred in the excitation signal of the LVDT. Like the circuit illustrated in FIG. 2, the preferred embodiment of FIG. 5 integrates the half cycle of the position signal generated by the LVDT secondary and then in the succeeding half cycle will integrate the reference input signal. The reference input signal is the excitation signal for the LVDT. The integrated reference signal is then compared to a voltage reference to provide a correction, should one exist, which is then applied to the signal from the secondary to compensate for any changes which may have occurred in the excitation signal to the LVDT.

As above indicated, the timing logic 202 is provided by a properly programmed EPLD. A timing clock 204 provides a continuous stream of clock pulses to the timing logic 202 which are used to generate the various gates or command signals emanating from the timing logic 202. The timing logic is activated by an output signal generated by the zero crossing detector 206 which has applied thereto the excitation signal of the LVDT after the same has been summed at the summing junction 208. The zero crossing signal as shown at 302 on FIG. 6 is utilized to generate a integrating reset signal as shown at 304 which is applied over the INT RST 210 which is applied to the integrator 212. The zero crossing detector also provides a signal from the timing logic 202 to select whether the LVDT or the reference will be integrated by the integrator 212. Upon the zero crossing signal going high as shown in 302 of FIG. 6 the switch 214 is closed and the position of the LVDT secondary is integrated as is shown by the timing diagram at 306. When the zero crossing goes low then the reference is integrated as is shown at 308. That is, when the timing logic applies an enabling signal over the lead 216, switch 214 is closed and when a signal is applied over the lead 218 the switch 220 is closed and the switch 214 is open.

Assuming that switch 214 is closed the signals generated by the LVDT secondary upon movement of the slug as above described will apply a signal to the analog multiplier 222 which is in turn applied to the integrator 212 for integration. Simultaneously with the closing of the switch 214 the integrator 212 will have been reset by the signal applied over the lead 210. The output of the integrator 212 is then applied to the track and hold circuit 224 and upon application of an appropriate timing signal over the lead 226 the track and hold output will be applied to the sample and hold 228 which then provides the position signal over the lead 230 as above described.

Upon the zero crossing signal going low the switch 214 is opened and the switch 220 is closed in response to commands from the timing logic 202 as well as the integrator 212 being reset. During this portion of the operation the excitation signal of the LVDT is applied through the switch 220 to the multiplier 222 and then to the integrator 212 for integration. The output from the integrator generated in response to the reference or excitation signal being integrated is applied to the track and hold circuit 232 and upon application of a proper gating signal over the lead 234 to the sample and hold circuit 236. The output of the sample and hold circuit 236 upon application of proper control signal of over the lead 238 from the timing logic is then applied to the summing junction 240 along with a fixed reference voltage from the source 242 thereof. The output from the summing junction 240 is then applied to an integrator 244 which provides an output signal over the lead 246 representative of a difference in which may have occurred as a result of the drift in amplitude or frequency of the excitation signal. The output applied over the lead 246 to the analog multiplier 222 is used to correct the output signal from the integrator 212 during the time the integrator 212 is integrating either the reference signal or the output from the secondary, that is the position signal of the LVDT. It is in this way that any change in frequency or amplitude of the output signal from the LDVT secondary caused by drift in frequency or amplitude of the excitation signal is compensated for. That is, again, it will be seen that with the circuit of FIG. 5 the position signal which is generated is independent of amplitude or frequency and is thus dependent only on position of the position sensor. That portion of the circuit shown in FIG. 5 providing the velocity and acceleration signals is substantially the same as that shown in FIG. 2. The only difference is the utilization of a frequency to voltage converter 248 to provide a timing signal for use in generating the velocity and the acceleration. As those skilled in the art will understand such is necessary since velocity is the differentiation of position with respect to time while acceleration is the differentiation of velocity with respect to time. In order to provide this time representing signal a reference frequency which is generated by the zero crossing detector 206 is applied to the frequency to voltage converter 248 and the output signal therefrom is applied to the analog multipliers 250 and 252 to provide the desired signal to generate velocity and acceleration respectively.

The timing for the various sample and hold circuits is shown in FIG. 6. For example, the reference sample and hold signal at 238 as shown at 310, the timing signal for the acceleration sample and hold circuit 254 is shown at 312, the timing signal for the velocity sample and hold 256 is shown at 314 while the position signal is shown at 316.

There has thus been disclosed a demodulator circuit which utilizes a single integrator for integrating both the sensor position signal as well as the excitation signal for providing appropriate corrective signals responsive to deviations in the frequency or amplitude of the excitation signal based upon a particular and specific reference. The output position signal may then further be utilized to develop velocity and acceleration information.

What is claimed is:

1. For use with a displacement sensor which produces an output signal in response to an excitation signal having a frequency coupled to receive the output signal, a demodulator circuit for demodulating the output signal to provide displacement information independent of changes in the excitation signal, comprising:

a circuit for generating the displacement information from the output signal;

an adjustment circuit for monitoring a reference signal generated based upon the excitation signal and adjusting operation of the generating circuit based upon changes in the frequency and/or the amplitude of the reference signal over a period of time; and a timing circuit for generating a timing signal based upon the frequency of the reference signal and timing logic responsive to the timing signal for providing a plurality of control signals to the generating circuit and the adjustment circuit.

2. A demodulator as in claim 1, wherein the adjustment circuit comprises a multiplier having a first input coupled to receive the output signal from the displacement signal, a first integrator coupled to integrate the reference signal, a first sampling circuit coupled to sample output of the first integrator, an adder having one input coupled to receive a predetermined voltage and another input coupled to receive output of the first sampling circuit, a second integrator coupled to receive output from the adder, the output of the second integrator being coupled to the multiplier and one of said plurality of control signals being coupled for resetting the first integrator.

3. A demodulator as in claim 2, wherein the timing circuit comprises a phase lock loop receiving the reference signal for generating the control signals.

4. A demodulator as in claim 2, wherein the timing generator comprises a programmed EPLD receiving zero crossing of the reference signal for generating the control signals.

5. A demodulator as in claim 3, further comprising a buffer for buffering the reference signal.

6. A demodulator as in claim 1, wherein the circuit for generating displacement information comprises means for integrating the output signal over a time period to generate the displacement information, and wherein the adjustment circuit comprises means for integrating the reference signal and means responsive to output of the reference signal integrating means for adjusting the time period in which the output signal is integrated.

7. A demodulator as in claim 6, further comprises a circuit for recording an output of the output signal integrating means at more than one time instant.

8. A demodulator as in claim 7, wherein said recording circuit comprises a plurality of sampling circuits.

9. A demodulator as in claim 7, wherein the recording circuit includes a circuit for recording an output $S(t_0)$ of the output signal integrating means at a first time instant $t_0$, an output $S(t_{-1})$ of the output integrator at a second time instant $t_{-1}$ before the first time instant $t_0$, and an output $S(t_{-2})$ of the output integrator at a third time instant $t_{-2}$ before the second time instant $t_{-1}$.

10. A demodulator as in claim 9, further comprising a circuit for calculating $S(t_0)-S(t_{-1})$ to determine velocity of a displacement.

11. A demodulator as in claim 9, further comprising a circuit for calculating $S(t_0)+S(t_{-2})-2S(t_{-1})$ to determine acceleration of a displacement.

12. A demodulator as in claim 9, further comprising a circuit for modifying the time instant $t_{-1}$ and $t_{-2}$ in response to a change of the frequency of excitation signal.

* * * * *